US007017402B2

United States Patent

Kagleder

(10) Patent No.: US 7,017,402 B2
(45) Date of Patent: Mar. 28, 2006

(54) DEVICE AND METHOD FOR MONITORING A TANK VENTILATION SYSTEM

(75) Inventor: Erich Kagleder, Piding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 282 days.

(21) Appl. No.: 10/204,691

(22) PCT Filed: Jan. 31, 2001

(86) PCT No.: PCT/EP01/00981

§ 371 (c)(1),
(2), (4) Date: Nov. 27, 2002

(87) PCT Pub. No.: WO01/63117

PCT Pub. Date: Aug. 30, 2001

(65) Prior Publication Data

US 2003/0140685 A1 Jul. 31, 2003

(30) Foreign Application Priority Data

Feb. 23, 2000 (DE) ................................ 100 08 189

(51) Int. Cl.
*G01M 19/00* (2006.01)

(52) U.S. Cl. ...................................................... 73/118.1

(58) Field of Classification Search ............... 73/117.3, 73/118.1, 118.2; 123/698, 520; 701/29
See application file for complete search history.

(56) References Cited

U.S. PATENT DOCUMENTS 4,794,790 A 1/1989 Margarit-Metaxa et al.
5,125,385 A * 6/1992 Frinzel ........................ 123/698
5,182,945 A * 2/1993 Setter ......................... 73/118.1
5,195,498 A * 3/1993 Siebler et al. .............. 123/698
5,205,263 A * 4/1993 Blumenstock et al. ....... 123/520
5,243,853 A * 9/1993 Steinbrenner et al. ...... 73/117.3
5,243,944 A * 9/1993 Blumenstock .............. 123/520
5,442,551 A * 8/1995 Denz et al. .................... 701/29
5,604,305 A * 2/1997 Denz et al. ................ 73/118.1
5,651,351 A 7/1997 Matsumoto et al.
5,666,925 A * 9/1997 Denz et al. ................. 123/520

FOREIGN PATENT DOCUMENTS

| | | |
|---|---|---|
| DE | 3624441 | 1/1989 |
| DE | 4401887 | 8/1994 |
| JP | 11343925 | 12/1999 |

* cited by examiner

*Primary Examiner*—Eric S. McCall
*Assistant Examiner*—Octavia Davis
(74) *Attorney, Agent, or Firm*—Crowell & Moring LLP

(57) ABSTRACT

The invention relates to a device and a method for testing a tank ventilation system with a tank ventilation valve in a motor vehicle, comprising an engine speed sensor, an air flow sensor and/or an idle controller for providing an air mass signal, as well as an evaluating unit, which compares the changes in speed and air masses with at least one threshold value when the tank ventilation valve is opened and closed. To improve the diagnosis of the tank ventilation system, it is proposed that the evaluating unit be designed in such a manner that a total reaction value, which is compared with a threshold value, is formed from the engine speeds when the tank ventilation valve is opened and closed as well as the air masses when the tank ventilation valve is closed and opened.

13 Claims, 1 Drawing Sheet

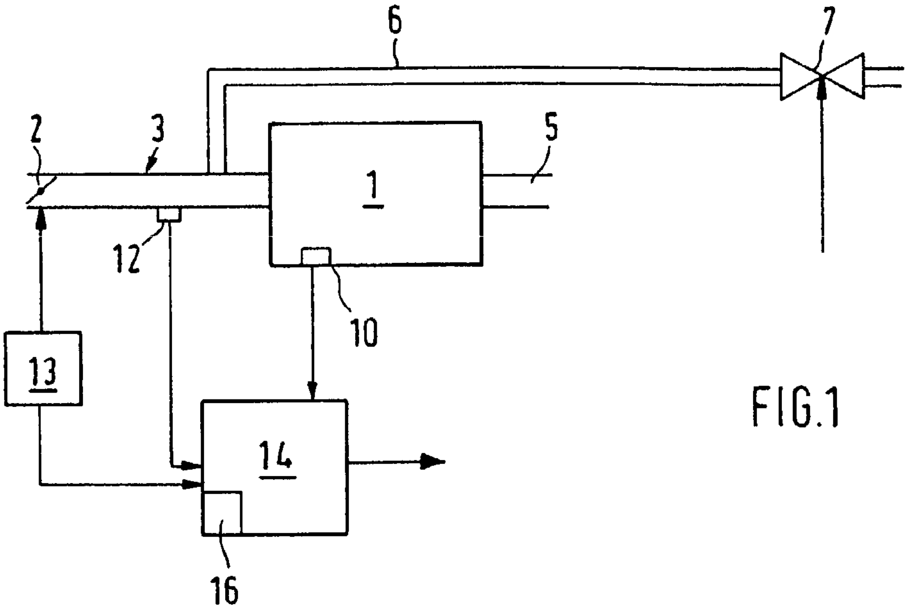
FIG.1
FIG.2
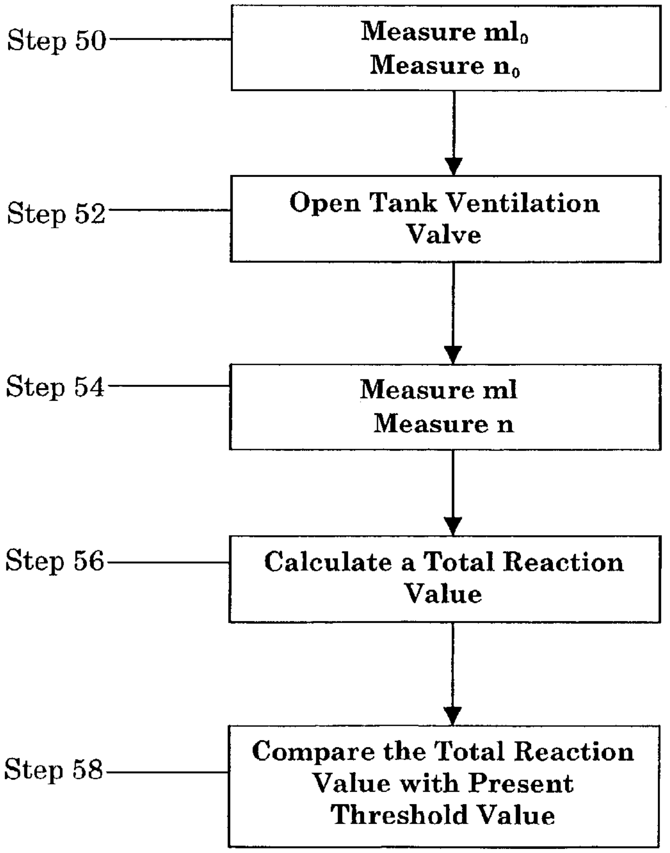

DEVICE AND METHOD FOR MONITORING A TANK VENTILATION SYSTEM

BACKGROUND AND SUMMARY OF THE INVENTION

This application claims the priority of Application No. 100 08 189.4, filed Feb. 23, 2000, in Germany, the disclosure of which is expressly incorporated by reference herein.

The invention relates to a device and a method for testing a tank ventilation system having a tank ventilation valve in a motor vehicle.

It is known to open and close selectively the tank ventilation valve of a tank ventilation system for testing its operability. The motor reactions to the opening and closing of the tank ventilation valve are then examined, for example, if the speed and the air mass change when opening and closing the tank ventilation valve. In past systems, however, it is only known to compare each operating datum by itself with a threshold value in order to test the operability of the tank ventilation system.

Depending on how fast an idle controller reacts, however, to the changes made by opening and closing the tank ventilation valve, different reactions result. In the case of a slow idle controller the result will be predominantly a reaction in the speed. In the case of a fast idle controller, the result will be predominantly a reaction in the air mass. Moreover, all reactions in between, where both the speed and the measured and preset air mass change, are also, of course, possible. In total, this means that the respective reaction is highly dependent on the application. In the event that the speed and the air mass change simultaneously, the amplitudes of each individual signal may vary widely. This state leads altogether to a poor signal-to-noise ratio.

The object of the present invention is to provide a device and a method for testing a tank ventilation system. The device and method allow an accurate and flawless test of its operability independent of the applications of an idle controller.

This and other objects and advantages are achieved by the testing method and apparatus according to the invention, in which each respective individual variable (operating datum) is not compared with its own threshold value. Rather the different changes of the individual variables are combined into a total reaction, which is then evaluated. In the evaluation one can then apply a well-known method of comparison with a threshold value.

In the case of the inventive device and the inventive method, one may proceed from the hypothesis that in the case of an idling engine the respective air masses and speeds are approximately proportional (n~ml). One assumes in particular that, when the tank ventilation valve is closed, the quotient resulting from the air mass and speed is approximately constant ($ml_0$: $n_0$ is approximately constant).

Usually the air mass, which is additionally supplied by way of the tank ventilation valve, is not measured or specified. Therefore, when the tank ventilation valve is opened, more air is made available to the engine than is preset by way of the idle controller. Thus, the total air mass with the tank ventilation valve open is derived from the measured air mass (ml) and the air mass $ml_{TEV}$, flowing in additionally by way of the tank ventilation valve.

In place of an air mass (ml), measured with an air flow sensor, the preset air mass nominal value (ml_nominal) of the idle controller may also be used as the air mass signal. This feature is especially advantageous if the measured air mass value cannot be resolved finely enough or if it varies too much. Naturally the use of the air mass nominal value is also suitable as the air mass signal when there is no air flow sensor.

In an advantageous embodiment, a relative change in the air mass is computed from the air mass and the engine speed when the tank ventilation valve is opened and from the air mass and the speed when the tank ventilation valve is closed. The relative air mass can be calculated, on the one hand, from a difference of the quotient resulting from the engine speed for an opened tank ventilation valve and the engine speed for a closed tank ventilation valve, and, on the other hand, from the quotient resulting from the air mass with the tank ventilation valve open and the air mass with the tank ventilation valve closed.

The methods disclosed in the patent claims are suitable for operating the device, according to the invention.

BRIEF DESCRIPTION OF THE DRAWINGS

FIG. 1 is a schematic block diagram of an embodiment of the present invention; and FIG. 2 depicts a simple method for operating the device, according to FIG. 1.

DETAILED DESCRIPTION OF THE DRAWINGS

FIG. 1 is a schematic block diagram of an engine 1 with an exhaust channel 5 and an intake area 3. In the intake area 3 a throttle valve 2 and an air flow sensor 12 are connected in series. The air flow sensor 12 measures the air mass moving through an intake channel and sends a corresponding signal to an evaluating unit 14.

In addition, the engine 1 may have a speed sensor 10, which also sends its speed signal to the evaluating unit 14. Furthermore, a threshold value 16 may be stored in the evaluating unit 14.

The throttle valve 2 may be actuated, among other things, by an idle controller 13, which sends an air mass nominal value ml_nominal, which is equivalent to the degree that the throttle valve is open, to the evaluating unit 14.

Furthermore, there is a tank ventilation system, of which in the present drawing only the tank ventilation valve 7 with a feed channel 6 is shown. The air, flowing through the tank ventilation valve 7, is fed to the intake area 3 by way of the feed channel 6. The tank ventilation valve 7 may be closed or opened (see actuation shown by the arrow).

Depending on the switching state of the tank ventilation valve 7, there is an engine reaction in the form of a change in the engine speed or air mass or both, flowing through the intake area 3.

At this stage in the present embodiment, the tank ventilation system is tested in such a manner that first the air mass $ml_0$ and the related speed no are measured with the tank ventilation valve 7 closed (step 50 in FIG. 2).

Then the tank ventilation valve 7 is opened (step 52).

Subsequently the air mass ml and the related speed n are measured with the tank ventilation valve 7 open (step 54).

Then a total reaction value is calculated in step 56. In the present embodiment one assumes that, when the engine is idling, the air mass and the speed are approximately proportional (n~ml). The result is that the quotient derived from the air mass and the speed is approximately constant:

$$\frac{ml_0}{n_0} \approx \text{constant.}$$

In contrast, when the tank ventilation valve 7 is opened, the result is a total air mass $ml+ml_{TEV}$, where $ml_{TEV}$ describes the air flow through the tank ventilation valve 7.

Thus, the result is altogether the equation:

$$\frac{ml_0}{n_0} = \frac{ml + ml_{TEV}}{n}$$

Following transformation, the result is:

$$\frac{ml_{TEV}}{ml_0} = \frac{n}{n_0} - \frac{ml}{ml_0}$$

Thus, the quotient resulting from $ml_{TEV}/ml_0$ characterizes the relative change in the air mass. In the present case it is also the total reaction value, which describes altogether the engine reaction.

The tank ventilation valve 7 may be opened in an advantageous manner continuously, that is ramp-like or step-like. At the same time the steps 54, 56 and 58 are carried out. If one reaches the threshold value in step 58, the tank ventilation valve 7 does not have to be opened any further.

Of course, one may also carry out analogously the reaction evaluation from an opened tank ventilation valve to a closed tank ventilation valve. In carrying out the process in both directions one obtains maximum information from the selective opening or closing of the tank ventilation valve and thus concomitant certainty of diagnosis.

With respect to the total reaction value, in the present case the relative change in the air mass is compared with the threshold value 16. Depending on whether the value exceeds or falls below the threshold value, one obtains information on whether the tank ventilation valve 7 and the tank ventilation system are functioning properly.

If the air mass signal, coming from the air flow sensor 12, fluctuates too much, one can resort to the air mass nominal value ml_nominal, which comes from the idle controller 13 and which is used as a substitute for the air mass value ml, to be measured.

With the present invention, one is relatively independent of an application of the idle controller. Furthermore, one achieves a better signal-to-noise ratio than with the method described in the introductory part of the specification. Moreover, the tank ventilation valve does not have to be opened far until a specific reaction occurs. Thus, this means less interruption in the idle position during a test run. Moreover, the design of the present method is simpler than the originally applied method, since only one variable, namely the total reaction, must be applied.

The invention claimed is:

1. A device for testing a tank ventilation system with a tank ventilation valve in a motor vehicle, comprising:

an engine speed sensor;

an air flow sensor;

an idle controller for providing an air mass signal; and an evaluating unit, which compares changes in engine speed and air mass with at least one threshold value when said tank ventilation valve is opened and closed;

wherein said evaluating unit forms a total reaction value from said engine speed and said air mass when said tank ventilation system is opened and closed and compares said total reaction value with said at least one threshold value.

2. The device of claim 1, wherein a relative change in said air mass ($ml_{TEV}/ml_0$) is calculated from said air mass and said engine speed when said tank ventilation valve (ml, n) is opened, and from said air mass and said engine speed when said tank ventilation valve is closed ($ml_0/n_0$).

3. The device of claim 2, wherein said relative change in said air mass ($ml_{TEV}/ml_0$) is calculated, on one hand, as the difference of quotients from said engine speed when said tank ventilation valve (n) is opened and said engine speed when said tank ventilation valve ($n_0$) is closed, and, on another hand, said air mass when said tank ventilation valve (ml) is opened and said air mass when said tank ventilation valve ($ml_0$) is closed.

4. A method for testing a tank ventilation system comprising:

measuring a first engine speed when a tank ventilation valve is closed ($n_0$);

measuring a second engine speed when said tank ventilation valve is opened (n);

determining a first air mass when said tank ventilation valve is closed ($ml_0$);

determining a second air mass when said tank ventilation valve is opened (ml);

forming a total reaction value from said first engine speed and said second engine speed and said first air mass and said second air mass; and comparing said total reaction value with a preset threshold value.

5. The method of claim 4, wherein a relative change in the air mass ($ml_{TEV}/ml_0$) is calculated from said second air mass and said second engine speed when the tank ventilation valve is opened and from said first air mass and said first engine speed when the tank ventilation valve is closed.

6. The method of claim 5, wherein said relative air mass is calculated, on one hand, as the difference of the quotients from said second engine speed when said tank ventilation valve (n) is opened and said first engine speed when said tank ventilation valve ($n_0$) is closed, and, on another hand, said second air mass when said tank ventilation valve (ml) is opened and said first air mass when said tank ventilation valve ($ml_0$) is closed.

7. A device for testing a tank ventilation system with a tank ventilation valve in a motor vehicle, comprising:

an engine speed sensor;

an air flow sensor;

an evaluating unit, which compares changes in an engine speed and an air mass with a first threshold value when said tank ventilation valve is opened; and an idle controller for providing an air mass signal;

wherein said evaluating unit compares said changes in said engine speed and said air mass with a second threshold value when said tank ventilation valve is closed, and wherein said evaluating unit forms a total reaction value from said engine speed and said air mass when said tank ventilation system is opened and closed and compares said total reaction value with at least one of said first threshold value and said second threshold value.

8. The device of claim 7, wherein a relative change in said air mass is calculated from said air mass and said engine speed when said tank ventilation valve is opened, and from said air mass and said engine speed when said tank ventilation valve is closed.

9. The device of claim 8, wherein said relative change in said air mass is calculated as the difference of quotients from said engine speed when said tank ventilation valve is opened and said engine speed when said tank ventilation valve is closed, and said air mass when said tank ventilation valve is opened and said air mass when said tank ventilation valve is closed.

10. A method for testing a tank ventilation system comprising:

- measuring a first engine speed when a tank ventilation valve is closed;
- measuring a second engine speed when said tank ventilation valve is opened;
- determining a first air mass when said tank ventilation valve is closed;
- determining a second air mass when said tank ventilation valve is opened;
- forming a total reaction value from said first engine speed and said second engine speed and said first air mass and said second air mass; and
- comparing said total reaction value with a preset threshold value.

11. The method of claim 10, wherein a relative change in air mass is calculated from said second air mass and said second engine speed when said tank ventilation valve is opened and from said first air mass and said first engine speed when said tank ventilation valve is closed.

12. The method of claim 11, wherein said relative change in air mass is calculated as a difference of quotients from said second engine speed when said tank ventilation valve is opened and said first engine speed when said tank ventilation valve is closed, and said second air mass when said tank ventilation valve is opened and said first air mass when said tank ventilation valve is closed.

13. A method for testing a tank ventilation system comprising the steps of:

- measuring a first engine speed when a tank ventilation valve is closed;
- measuring a second engine speed when said tank ventilation valve is opened;
- determining a first air mass when said tank ventilation valve is closed;
- determining a second air mass when said tank ventilation valve is opened;
- forming a total reaction value from said first engine speed and said second engine speed and said first air mass and said second air mass; and
- comparing said total reaction value with a preset threshold value.

* * * * *